United States Patent
Someno et al.

(10) Patent No.: US 7,050,194 B1
(45) Date of Patent: May 23, 2006

(54) IMAGE PROCESSING APPARATUS, METHOD OF PROCESSING IMAGES, AND PRINTING APPARATUS TO WHICH IMAGE PROCESSING METHOD IS APPLIED

(75) Inventors: Masahiro Someno, Nagano-ken (JP); Shoji Kojima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/444,843

(22) Filed: Nov. 22, 1999

(30) Foreign Application Priority Data

Nov. 27, 1998 (JP) .................................. 10-353964

(51) Int. Cl.
*G06F 15/00* (2006.01)
*G06K 1/00* (2006.01)

(52) U.S. Cl. ........................ 358/1.9; 358/1.1; 358/296; 382/266; 382/268

(58) Field of Classification Search ................. 358/1.9, 358/3.06, 3.13, 3.3, 3.03, 1.18, 450, 1.1, 358/1.11, 1.15, 252, 296; 382/284, 260, 382/267, 268, 266

See application file for complete search history.

(56) References Cited

U.S. PATENT DOCUMENTS

| | | | |
|---|---|---|---|
| 4,668,996 A | | 5/1987 | Hatayama et al. .......... 358/3.23 |
| 4,756,636 A | * | 7/1988 | Maruyama et al. .......... 400/624 |
| 4,958,236 A | * | 9/1990 | Nagashima et al. ........ 358/445 |
| 5,768,411 A | | 6/1998 | Shu et al. .................... 382/162 |
| 6,145,960 A | * | 11/2000 | Kanda et al. .................. 347/41 |
| 6,175,424 B1 | * | 1/2001 | Iino et al. .................... 358/1.9 |
| 6,320,675 B1 | * | 11/2001 | Sakaki et al. ................ 358/1.9 |

FOREIGN PATENT DOCUMENTS

| | | |
|---|---|---|
| EP | 0 295 105 | 12/1988 |
| EP | 295105 A2 * | 12/1988 |
| EP | 0 849 934 | 6/1998 |
| JP | 63-309455 | 12/1988 |
| JP | 04178965 A * | 6/1992 |

\* cited by examiner

*Primary Examiner*—Gabriel Garcia
*Assistant Examiner*—Thierry L. Pham
(74) *Attorney, Agent, or Firm*—Oblon, Spivak, McClelland, Maier & Neustadt, P.C.

(57) ABSTRACT

A printing apparatus of the present invention prints an image corresponding to image data, which are divided into a plurality of pages and supplied from an application program, on a roll of machine glazed paper without any margin set between the adjoining pages. This arrangement enables printing on a large-sized printing medium, such as a banner. A printer driver incorporated in the printing apparatus causes the image data divided into the plurality of pages to be subjected to halftone processing according to an error diffusion method. When a standard printing mode is specified, an error buffer is initialized on every instruction of a new page. When a continuous printing mode is specified, on the other hand, the error buffer is not initialized. This causes an error occurring in a certain pixel included in one page to be diffused to pixels included in a next page in the continuous printing mode. The arrangement of the present invention enables the image data divided into a plurality of pages to be collectively processed by the halftone processing and thereby improves the picture quality of the image especially in the vicinity of a boundary between the adjoining pages.

10 Claims, 12 Drawing Sheets ing to the specification or the non-specification of the continuous mode.

IMAGE PROCESSING APPARATUS, METHOD OF PROCESSING IMAGES, AND PRINTING APPARATUS TO WHICH IMAGE PROCESSING METHOD IS APPLIED

BACKGROUND OF THE INVENTION

1. Field of the Invention

The present invention relates to an image processing apparatus that collectively processes image data with regard to a plurality of pages by halftone processing, a corresponding method of processing images, a printing apparatus to which the technique of image processing is applied, and a recording medium in which a program for executing the technique of image processing is recorded.

2. Description of the Related Art

The ink jet printer, which creates dots using a plurality of different color inks ejected from a plurality of nozzles provided on a print head and thereby records an image, has been proposed as an output device of a computer and widely used to print an image processed by the computer in a multi-color, multi-tone manner. This printer enables an image to be printed both on standard-sized printing medium, such as a sheet of cut paper, and a large-sized printing medium, such as a roll of machine glazed paper. The latter case is hereinafter referred to as continuous printing. A large image may be printed on a printing medium of several ten meters, for example, a banner.

There is generally a restriction in quantity of image data processed at once by an application program. In the case of continuous printing, the application program accordingly supplies print data divided in a plurality of pages. In the case of standard printing, a certain margin is present between adjoining pages. The process of continuous printing removes the margin between the adjoining pages and thereby enables an integrated image to be printed while receiving image data divided into a plurality of pages.

The ink jet printer generally enables only binary expression, that is, either a dot on state or a dot off state, with regard to each pixel. The tone of image data is accordingly expressed by a dispersion of dots. The halftone processing sets the dot on-off state of each pixel based on the tone values of the image data, in order to attain such expression. A multi-value printer, which has been proposed recently, enables expression of tone values by ternary or greater notation with regard to each pixel by creating dots of different ink weights or by creating dots with inks of different densities. In the multi-value printer, the tone value expressible in each pixel is lower than the tone value of the image data, so that the halftone processing is carried out to express the respective tone values by the dispersion of dots. An error diffusion method and a dither method are known techniques applied for the halftone processing.

In the case of continuous printing, image data divided into a plurality of pages are supplied to the printer driver as discussed above. While the application program supplies image data of each page with a start-of-page code and an end-of-page code, the printer driver can not grasp the total number of pages until a code representing the end of image data is input. In order to carry out the image processing and printing procedure smoothly in parallel with the input of image data under such circumstances, the continuous printing process carries out the image processing and printing procedure independently for each page.

The continuous printing process divides a set of image data, which has been generated collectively and integrally, into a plurality of pages without taking into account a linkage of a resulting image. The independent image processing and printing procedure for each page results in undesirably lowering the picture quality on the boundary between adjoining pages. For example, the dispersion of dots unnaturally changes on the boundary of pages, and causes an unnatural variation in tone value. In another example, the unnatural change of the dispersion of dots causes a quasi-outline.

SUMMARY OF THE INVENTION

The object of the present invention is thus to provide a technique that prevents the picture quality from being lowered on a boundary between adjoining pages and improves the picture quality of a whole resulting image in the case of continuous printing.

At least part of the above and the other related objects is actualized by an image processing apparatus that processes image data with regard to a plurality of pages by a unit of each pixel by halftone processing. The image processing apparatus includes: an input unit that inputs the image data; and a halftone processing unit that causes the image data to be subjected to the halftone processing by a unit of each pixel in a state where continuity of the processing is assured between adjoining pages across a boundary.

The image processing apparatus of the present invention carries out the halftone processing while the continuity of the processing is assured between adjoining pages across a boundary. This arrangement effectively prevents the picture quality from being lowered on the boundary between the adjoining pages due to an unnatural change of the dispersion of dots, and thereby ensures the high-quality image processing.

In the state where the continuity of the processing is assured between adjoining pages, the halftone processing is not carried out independently for the respective pages, but the halftone processing with regard to each page is performed while a variety of parameters used in the halftone processing of a previous page are maintained. The parameters for ensuring the continuity of the processing may depend upon the contents of the halftone processing. The parameters include, for example, a parameter representing a density error occurring in each pixel, a parameter representing noise data that is taken into account in the course of the halftone processing of each pixel, and a parameter representing an allocation of a matrix used for the halftone processing.

In accordance with one preferable application of the present invention, the image processing apparatus further includes a mode input unit that inputs a specification of a continuous mode, in which the image data with regard to the plurality of pages are processed as a collective set of image data. In this application, the halftone processing unit carries out the halftone processing in the state where the continuity of the processing is assured, only when the specification of the continuous mode is input.

This arrangement ensures the high-quality image processing when the continuous mode is specified. In the case where the continuous mode is not specified, on the other hand, the halftone processing is carried out independently for the respective pages. When independent image data with regard to a plurality of pages are supplied, the halftone processing with the continuity ensured between the adjoining pages may adversely affect the results of the processing of the respective pages. The image processing apparatus of this application enables the adequate image processing according to an intention of the user, in response to an input of the specification of the continuous mode.

A variety of techniques may be applicable for the halftone processing. In one preferable embodiment of the present invention, an error diffusion method is applied for the halftone processing. In this case, the halftone processing unit causes the image data to be subjected to the halftone processing by a unit of each pixel according to an error diffusion method. The error diffusion method diffuses an error that occurs in a target pixel, which is an object to be processed, to a specific pixel that is present at a predetermined position relative to the target pixel, whether the target pixel and the specific pixel are included in an identical page or different pages. The error represents a difference between the input image data allocated to the target pixel and a result of the halftone processing with regard to the target pixel.

In this embodiment, the halftone processing unit, which carries out the halftone processing by the error diffusion method, diffuses an error occurring in a target pixel to a predetermined range, whether the predetermined range is present in the same page as the target pixel or in a different page. Namely the error is diffused from a certain area in a currently processed page, which is located in the vicinity of the boundary, to a preset area in a next page adjoining to the boundary. In this manner, the halftone processing unit of this arrangement ensures the continuity of the processing between the adjoining pages across the boundary.

The following describes a reason why the halftone processing unit of this embodiment improves the picture quality of the boundary between adjoining pages. The halftone processing by the error diffusion method is shown in FIGS. 13A and 13B. FIG. 13A shows a predetermined area, to which an error in a target pixel is diffused. In the example of FIGS. 13A and 13B, a density error occurring in a target pixel PP as a result of the determination of the dot on-off state is diffused to peripheral unprocessed pixels that are shown in hatch. FIG. 13B shows a sequence of the halftone processing carried out for each pixel included in image data according to the error diffusion method and predetermined areas, to which errors are diffused. In this example, the halftone processing is carried out with regard to image data, in which pixels are arrayed in a two-dimensional manner. It is assumed that the halftone processing starts from a left upper-most pixel and proceeds on the subsequent pixels on the same raster line in the main scanning direction. When reaching the end of each raster line, the processing is shifted to a next raster line that adjoins to the processed raster line in the sub-scanning direction. The arrows in the central portion of FIG. 13B represent the sequence of the halftone processing.

As the halftone processing proceeds in the sequence illustrated in FIG. 13B, for example, an error occurring in a pixel a1 and an error occurring in another pixel a2 are diffused to a specific pixel a3 in FIG. 13B. In another example, another specific pixel b8 has diffused errors from pixels b1 through b7. This means that a dot in the specific pixel a3 contributes to the tone expression of three pixels included in an area A, and that a dot in the specific pixel b8 contributes to the tone expression of eight pixels included in an area B. On the contrary, it may be expressed that the pixels a1 and a2 contribute to the tone expression of the pixel a3, and that the pixels b1 through b7 contribute to the tone expression of the pixel b8. The area A is explicitly narrower than the area B. The area that contributes to the tone expression of the specific pixel b8 is further widened by taking into account the fact that pixels diffusing errors to the pixels b1 through b7 indirectly diffuse the errors to the pixel b8. The halftone processing expresses the tone by the dispersion of dots in a fixed area. The wider area that can contribute to the tone expression of each pixel results in the less density error of the pixel. In the example of FIG. 13B, the area B thus ensures the more adequate tone expression than the area A. As discussed here, the error diffusion method in the conventional arrangement can not assure a sufficiently wide area that contributes to the tone expression of each pixel, in a first part of each page where the processing starts. This results in the lower quality of the halftone processing in the first part of each page than the other part of the page.

In the case where the halftone processing is carried out independently for the respective pages, there is accordingly an area, where the errors are not sufficiently diffused, in the vicinity of the boundary between each pair of adjoining pages. This undesirably lowers the picture quality on the boundaries between the respective pages. In the image processing apparatus of the present invention, on the other hand, an error occurring in a certain pixel in a currently processed page, which is located in the vicinity of the boundary between the currently processed page and a next page, is diffused to a predetermined area in the next page. In the example of FIG. 13B, an error occurring in a pixel c1 that belongs to a $1^{st}$ page is diffused to a preset area C that includes a pixel c2 and belongs to a $2^{nd}$ page. This arrangement ensures a sufficiently wide area that contributes to the tone expression of each pixel, in a first part of each page in the vicinity of the boundary between adjoining pages. This minimizes the density errors on the boundary and thereby improves the picture quality of the resulting image.

In accordance with one preferable application of the above image processing apparatus that applies the error diffusion method for the halftone processing, the input unit inputs a specification of a continuous mode, in which the image data with regard to the plurality of pages are processed as a collective set of image data, as well as page division data. The halftone processing unit includes: an error storage unit that temporarily stores diffused errors; an initialization unit that carries out initialization of the error storage unit in response to an input of the page division data; and a prohibition unit that prohibits the initialization of the error storage unit when the specification of the continuous mode is input.

This arrangement enables the adequate image processing according to an intention of the user, in response to an input of the specification of the continuous mode. This arrangement also facilitates the execution of the halftone processing in the continuous mode and in a non-continuous mode.

In another preferable embodiment of the image processing apparatus according to the present invention, the halftone processing unit carries out the halftone processing according to a dither method, which allows a dither matrix to be allocated across the boundary between the adjoining pages.

The dither method carries out the halftone processing according to the comparison between the tone values of image data and the threshold values included in a predetermined dither matrix. Since the image data has a greater size than that of the dither matrix, the dither method generally allocates the dither matrix to the respective pixels in a certain arrangement and carriers out the halftone processing. The halftone processing by the dither method is shown in FIGS. 16A and 16B. FIG. 16A shows a dither matrix as an available example. FIG. 16B shows an exemplified arrangement, in which the dither matrix is allocated to the respective pixels in sections.

The dither matrix is typically designed to ensure the sufficient dispersibility of dots within a single matrix. When the dither matrix is allocated independently to two different pages as shown by areas M1 and M2 in FIG. 16B, the sufficient dispersibility of dots may not be ensured on the boundary between the two pages.

The image processing apparatus of the present invention, on the other hand, allows the dither matrix to be allocated across the boundary between the two pages as shown by an area M3 in FIG. 16B. This ensures the sufficient dispersibility of dots on the boundary and thereby enables the high-quality image processing.

In accordance with one preferable application of the image processing apparatus that applies the dither method for the halftone processing, the input unit inputs a specification of a continuous mode, in which the image data with regard to the plurality of pages are processed as a collective set of image data, as well as page division data. The halftone processing unit includes: an allocation storage unit that stores an allocation of the dither matrix to pixels; an initialization unit that carries out initialization of the allocation storage unit in response to an input of the page division data so as to set the allocation of the dither matrix to a predetermined state in each page; and a prohibition unit that prohibits the initialization of the allocation storage unit when the specification of the continuous mode is input.

This arrangement enables the adequate image processing according to an intention of the user, in response to an input of the specification of the continuous mode. This arrangement also facilitates the execution of the halftone processing in the continuous mode and in a non-continuous mode.

The present invention is also directed to a printing apparatus that has a main part identical with that of the image processing apparatus discussed above.

The present invention thus provides a printing apparatus that creates dots based on image data with regard to a plurality of pages and thereby prints an image on a specific printing medium, which has a size of or over the plurality of pages. The printing apparatus includes: an input unit that inputs the image data; a halftone processing unit that causes the image data to be subjected to halftone processing by a unit of each pixel in a state where continuity of the processing is assured between adjoining pages across a boundary; and a dot creation unit that creates a dot in each pixel, based on a result of the halftone processing.

The present invention may be attained as a method corresponding to the image processing apparatus discussed above. The present invention is thus directed to a method of processing image data with regard to a plurality of pages by a unit of each pixel by halftone processing. The method includes the steps of: (a) inputting the image data; and (b) causing the image data to be subjected to the halftone processing by a unit of each pixel in a state where continuity of the processing is assured between adjoining pages across a boundary.

The present invention may also be attained as a computer program or a recording medium, on which the computer program is recorded.

The present invention is thus directed to a computer readable medium, in which a specific computer program is recorded, the specific computer program being used to process image data with regard to a plurality of pages by a unit of each pixel by halftone processing. The specific computer program has: a program code that causes a computer to input the image data; and a program code that causes the computer to process the input image data by a unit of each pixel by the halftone processing according to an error diffusion method, the error diffusion method diffusing an error that occurs in a target pixel, which is an object to be processed, to a specific pixel that is present at a predetermined position relative to the target pixel, whether the target pixel and the specific pixel are included in an identical page or different pages, the error being a difference between the input image data allocated to the target pixel and a result of the halftone processing with regard to the target pixel.

The present invention is also directed to another computer readable medium, in which a specific computer program is recorded, the specific computer program being used to process image data with regard to a plurality of pages by a unit of each pixel by halftone processing. The specific computer program has: a program code that causes a computer to input the image data; and a program code that causes the computer to process the input image data by a unit of each pixel by the halftone processing according to a dither method, which allows a dither matrix to be arranged across a boundary between adjoining pages.

The computer executes either one of these computer programs, so as to enable the high-quality image processing described previously.

Typical examples of the computer readable medium include flexible disks, CD-ROMs, magneto-optic discs, IC cards, ROM cartridges, punched cards, prints with barcodes or other codes printed thereon, internal storage devices (memories like RAM and ROM) and external storage devices of the computer, and a variety of other computer readable media. The computer readable medium may be constructed as a computer program itself or a variety of equivalent signals.

These and other objects, features, aspects, and advantages of the present invention will become more apparent from the following detailed description of the preferred embodiments with the accompanying drawings.

DESCRIPTION OF THE PREFERRED EMBODIMENT

(1) Structure of Apparatus

Figure 1:
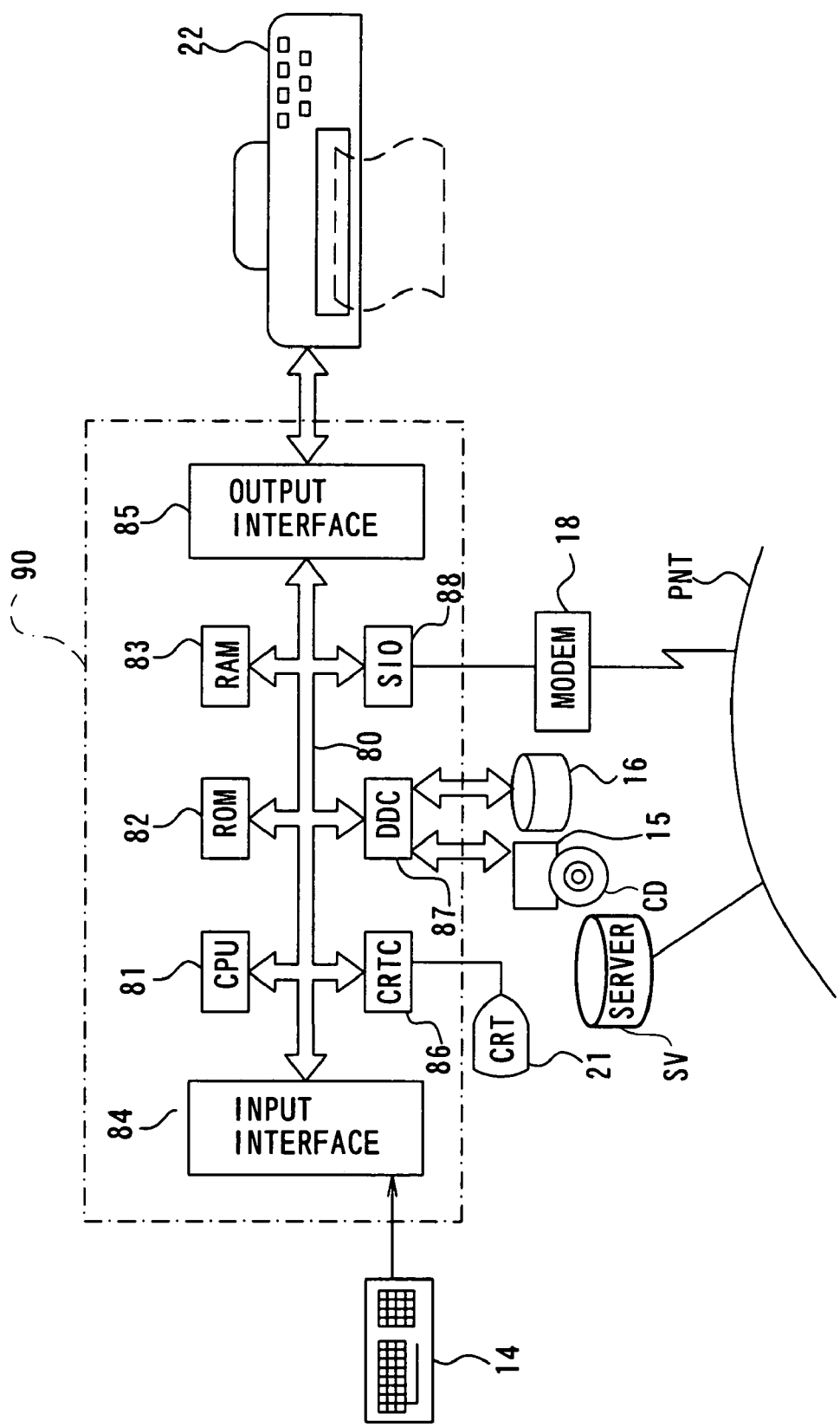
FIG. 1 is a block diagram schematically illustrating the structure of a system including an image processing apparatus and a printing apparatus as an embodiment according to the present invention.

FIG. 1 is a block diagram schematically illustrating the structure of a system including an image processing apparatus and a printing apparatus as an embodiment according to the present invention. The system includes a computer 90 connected to a color printer 22. The computer 90 reads and executes predetermined programs to function as the image processing apparatus and in combination with the printer 22 as the printing apparatus. The computer 90 includes a CPU 81 that executes a variety of operations according to the programs, a ROM 82, a RAM 83, and the following constituents mutually connected via a bus 80. An input interface 84 is in charge of inputting signals from a keyboard 14 and other input devices, whereas an output interface 85 is in charge of outputting data to the printer 22. A CRT controller (CRTC) 86 controls output of signals to a color CRT display 21. A disk drive controller (DDC) 87 controls transmission of data to and from a hard disk 16, a CD-ROM drive 15, and a flexible disk drive (not shown). A variety of programs loaded to the RAM 83 and executed as well as a variety of other programs provided in the form of a device driver are stored in the hard disk 16.

A serial input-output interface (SIO) 88 is also connected to the bus 80. The SIO 88 is connected to a modem 18 and further to a public telephone network PNT via the modem 18. The computer 90 is connected with an external network via the SIO 88 and the modem 18 and may gain access to a specific server SV to download a variety of programs into the hard disk 16. Another possible application reads the required programs from a flexible disk FD or a CD-ROM and causes the computer 90 to execute the input programs.

The printer 22 is an ink jet printer, which carries out both main scan and sub-scan to print an image. The main scan moves a print head, which has a plurality of nozzles for ejecting ink, forward and backward along a predetermined axis on printing paper. The sub-scan moves the print head relative to the printing paper in another direction that is perpendicular to the direction of the main scan. The detailed structure of the printer 22 will be discussed later.

Figure 2:
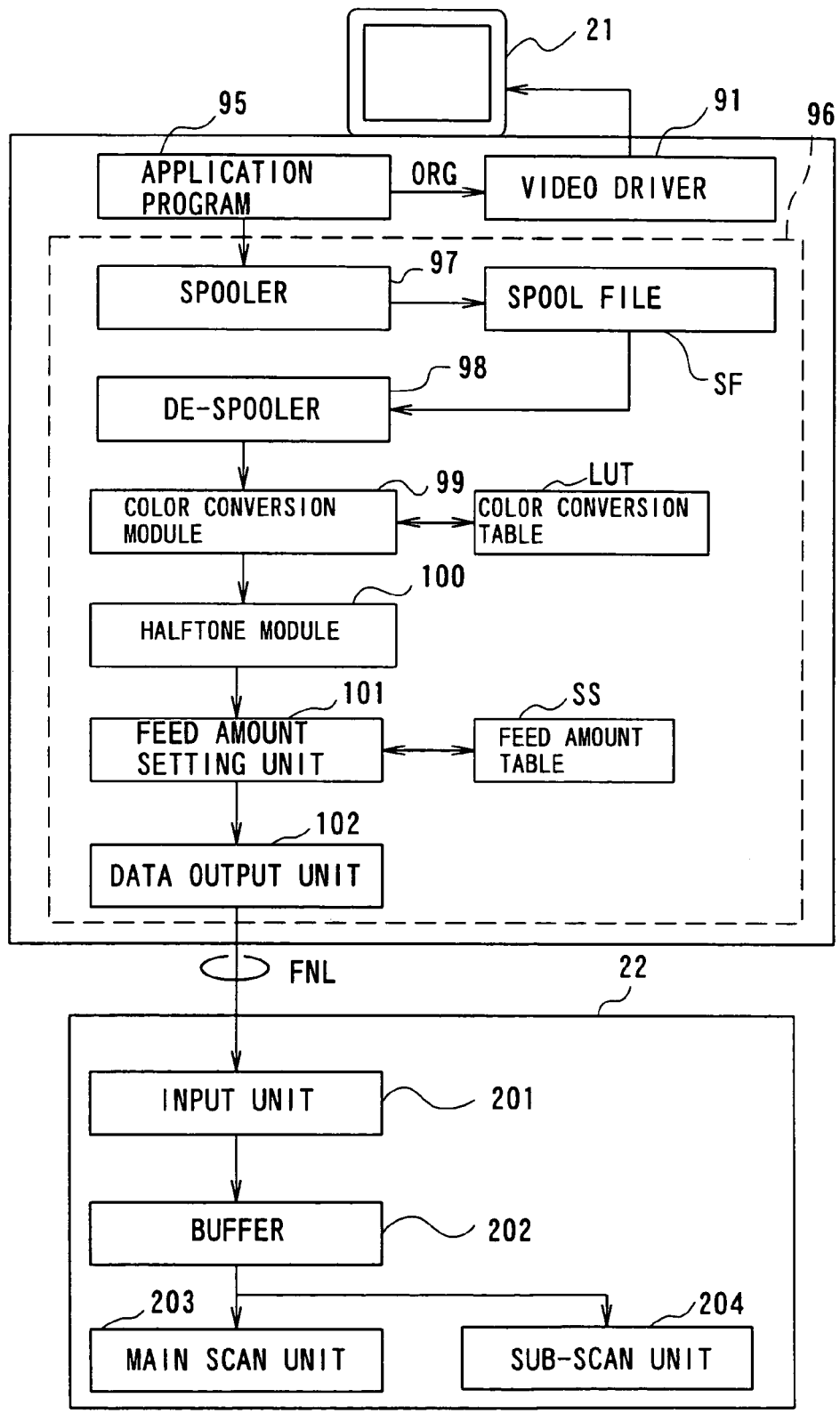
FIG. 2 is a block diagram illustrating a software configuration of the printing apparatus of the embodiment.

FIG. 2 is a block diagram illustrating a software configuration of the printing apparatus. The computer 90 executes an application program 95 on a specific operating system. A video driver 91 and a printer driver 96 are incorporated in the operating system. Image data ORG output from the application program 95 are processed by and transferred via the printer driver 96 as print data FNL to the printer 22. The application program 95 generates an image, which is to be printed on a large-sized printing medium, such as a banner, in response to an instruction input through the keyboard 14 or another input device. The application program 95 also causes an image corresponding to the image data ORG to be displayed on the CRT display 21 via the video driver 91. The image data ORG generated by the application program 95 consists of three color components, red (R), green (G), and blue (B).

In response to an instruction of printing given by the application program 95, a spooler 97 included in the printer driver 96 of the computer 90 receives the image data ORG as a set of drawing instructions from the application program 95 and stores the image data ORG into a spool file SF. The image data for a large-sized printing medium generated by the application program 95 are bulk in quantity and thus unable to be transferred at once to the printer driver 96. Because of the restriction on the operating system, the application program 95 divides the image data into pages of a predetermined size and successively transfers the divided image data to the printer driver 96. A de-spooler 98 included in the printer driver 96 carries out raster processing of the drawing instructions stored in the spool file SF and converts the drawing instructions to image data having the tone values of R, G, and B with regard to each pixel.

In addition to the spooler 97, the spool file SF, and the de-spooler 98, the printer driver 96 has a color conversion module 99, a halftone module 100, a feed amount setting unit 101, and a data output unit 102. The color conversion module 99 corrects the color components R, G, and B of the image data to color components expressible by the printer 22 (cyan, magenta, yellow, and black in this embodiment) by referring to a color conversion table LUT provided in advance. The printer 22 of this embodiment takes only a binary value, that is, either the dot-on state or the dot-off state, with regard to each pixel. The halftone module 100 accordingly sets the dot on-off state of each pixel according to the error diffusion method, in order to enable the tone values of the corrected image data to be expressed by the dispersion of dots created by the printer 22. The error diffusion method diffuses a density error, occurring in each pixel due to the dot on-off state set for the pixel, to peripheral unprocessed pixels, thereby attaining the minimum density error as a whole. The halftone module 100 carries out the halftone processing by the error diffusion method, while storing the error occurring in each pixel into an error buffer EB.

The feed amount setting unit 101 sets an amount of sub-scan according to the printing mode. The printing apparatus of this embodiment has two printing modes, that is, a continuous printing mode, in which one continuous image is printed on a large-sized printing medium, and a standard printing mode, in which images are printed on respective pages specified by the application program 95, as described later. An amount of sub-scan for each page corresponding to the selected printing mode has been registered in advance in a feed amount table SS. The feed amount setting unit 101 refers to this feed amount table SS and sets the amount of sub-scan corresponding to the selected printing mode. The feed amount setting unit 101 then detects the positions of the respective nozzles in the printer 22 and selects raster lines to be printed, based on the setting for the amount of sub-scan.

The data output unit 102 rearranges the print data of the respective raster lines in the main scanning direction of the print head to a sequence of data output to the print head. The printer driver 96 outputs both the processed image data and feed amount data, which specifies the amount of sub-scan, as the print data FNL to the printer 22.

In the printer 22, an input unit 201 receives the print data FNL output from the computer 90 and temporarily stores the input print data into a buffer 202. The data in the buffer 202 are then output to a main scan unit 203. The main scan unit 203 ejects ink according to the print data, while carrying out main scan of the print head. As the main scan unit 203 forms raster lines, a sub-scan unit 204 feeds the printing paper by the amount of sub-scan specified by the printer driver 96.

The input unit 201 successively inputs the print data FNL while the main scan unit 203 and the sub-scan unit 204 carry out the printing.

Figure 3:
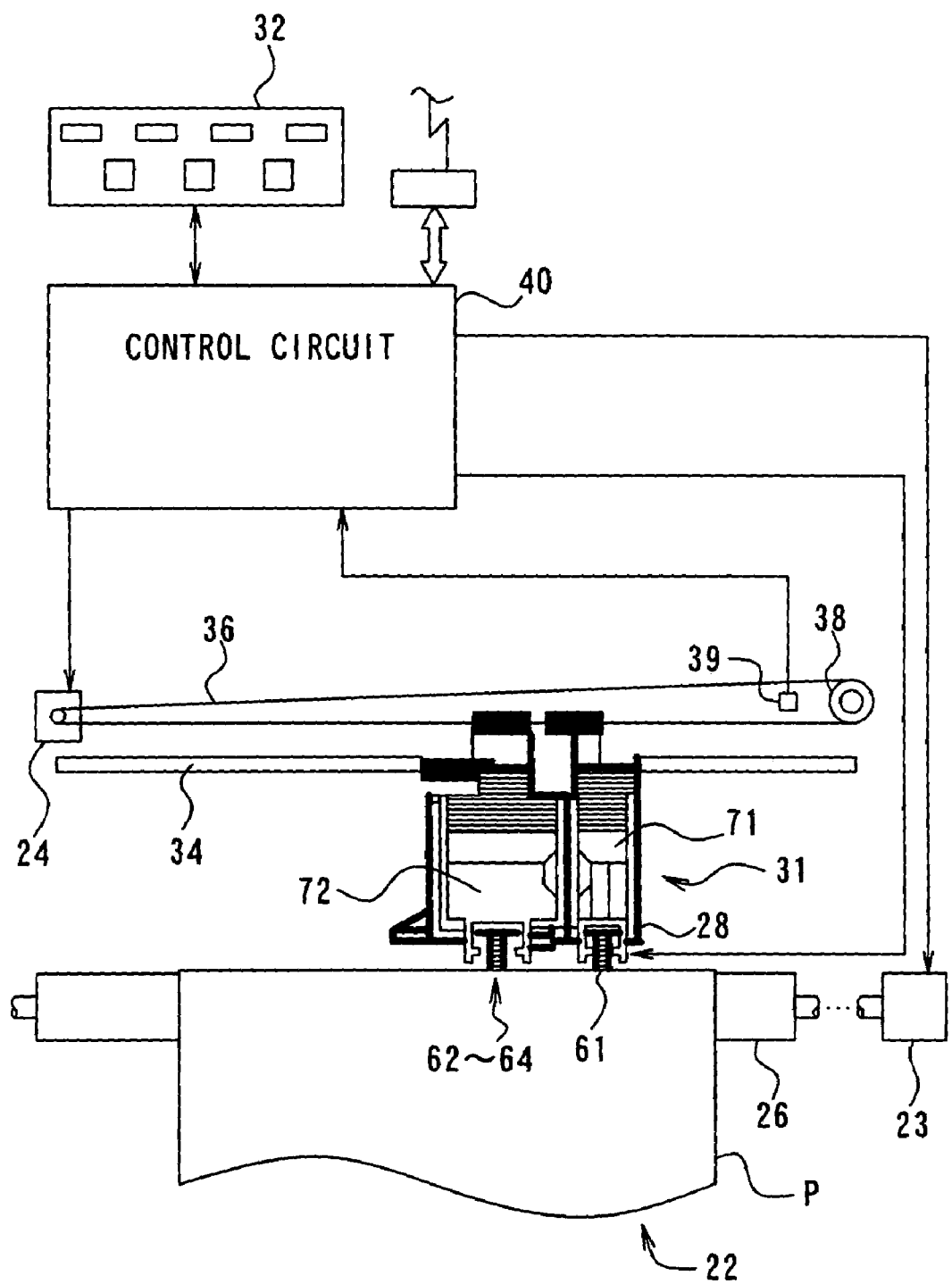
FIG. 3 schematically illustrates the structure of a printer 22 included in the printing apparatus of the embodiment.

The schematic structure of the printer 22 used in this embodiment is described with referring to FIG. 3. As illustrated in FIG. 3, the printer 22 has a mechanism that feeds printing paper P by means of a sheet feed motor 23, a mechanism that moves a carriage 31 forward and backward along an axis of a platen 26 by means of a carriage motor 24, a mechanism that drives a print head 28 mounted on the carriage 31 to eject ink and create dots, and a control circuit 40 that controls transmission of signals to and from the sheet feed motor 23, the carriage motor 24, the print head 28, and a control panel 32.

The mechanism of reciprocating the carriage 31 along the axis of the platen 26 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 that detects the position of the origin of the carriage 31.

A black ink cartridge 71 for black ink (K) and a color ink cartridge 72 in which three color inks, that is, cyan (C), magenta (M), and yellow (Y), are accommodated may be mounted on the carriage 31 of the printer 22. A total of four ink ejection heads 61 through 64 are formed on the print head 28 that is disposed in the lower portion of the carriage 31. When the black ink cartridge 71 and the color ink cartridge 72 are attached downward to the carriage 31, supplies of inks can be fed from the respective ink cartridges 71 and 72 to the ink ejection heads 61 through 64.

The printer 22 of the embodiment may use a sheet of cut paper or a roll of machine glazed paper for the printing paper P. The roll of machine glazed paper is supported on a support unit and fed to the printer 22, although being not specifically illustrated here. When printing of the image is concluded, the user cuts the roll of machine glazed paper to a desired length. The cutting operation may alternatively be carried out by a mechanism that automatically cuts the roll of machine glazed paper at a specified position in response to a signal output from the control circuit 40. The printer 22 of the embodiment can print a large-sized image over several ten meters using the roll of machine glazed paper.

Figure 4:
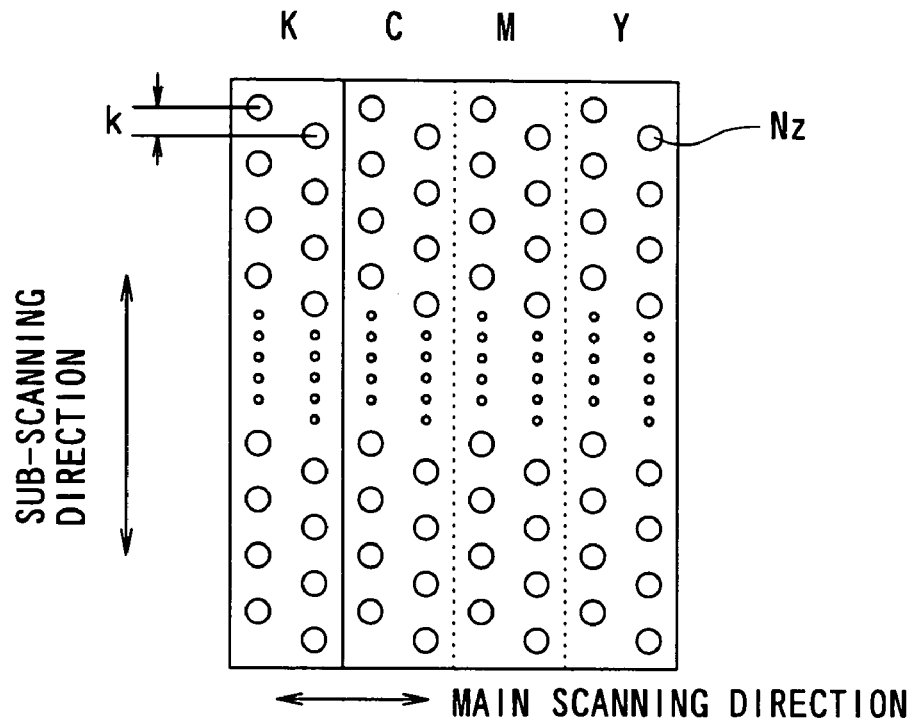
FIG. 4 shows an arrangement of ink jet nozzles on a print head.

FIG. 4 shows an arrangement of ink jet nozzles Nz in each of the ink ejection heads 61 through 64. The arrangement of nozzles shown in FIG. 4 includes four nozzle arrays, wherein each nozzle array ejects ink of each color and includes forty-eight nozzles Nz arranged in zigzag at a fixed nozzle pitch k. The positions of the corresponding nozzles in the respective nozzle arrays are identical in the sub-scanning direction. The nozzle pitch k is equal to 6 dots in this embodiment.

Figure 5:
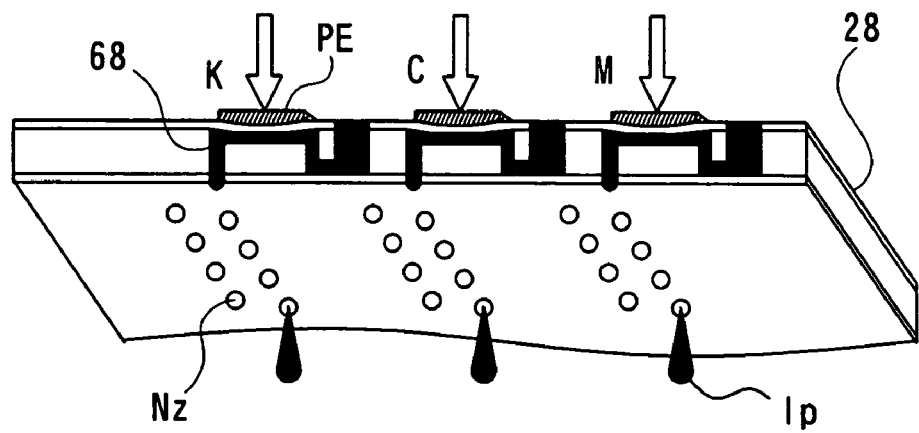
FIG. 5 shows the principle of creating dots.

The following describes the mechanism of ejecting ink and creating dots. FIG. 5 schematically illustrates the internal structure of the print head 28. For convenience of illustration, the ink ejection head for the yellow ink is omitted. A piezoelectric element PE is disposed corresponding to each of the forty-eight nozzles Nz formed on each of the ink ejection heads 61 through 64 at a position that comes into contact with an ink conduit 68 for leading ink to the nozzle Nz. FIG. 5 illustrates a configuration of the piezoelectric elements PE and the nozzles Nz. As is known by those skilled in the art, the piezoelectric element PE has a crystal structure that is subjected to mechanical stress due to application of a voltage and thereby carries out extremely high-speed conversion of electrical energy into mechanical energy. Application of a voltage between electrodes on both ends of the piezoelectric element PE for a predetermined time period causes the piezoelectric element PE to extend for the predetermined time period and deform one side wall of the ink conduit 68 as shown in FIG. 5. The volume of the ink conduit 68 is reduced with an extension of the piezoelectric element PE, and a certain amount of ink corresponding to the reduced volume is ejected as an ink particle Ip from the end of the nozzle Nz at a high speed. The ink particles Ip soak into the printing paper P set on the platen 26, so as to implement printing.

Figure 6:
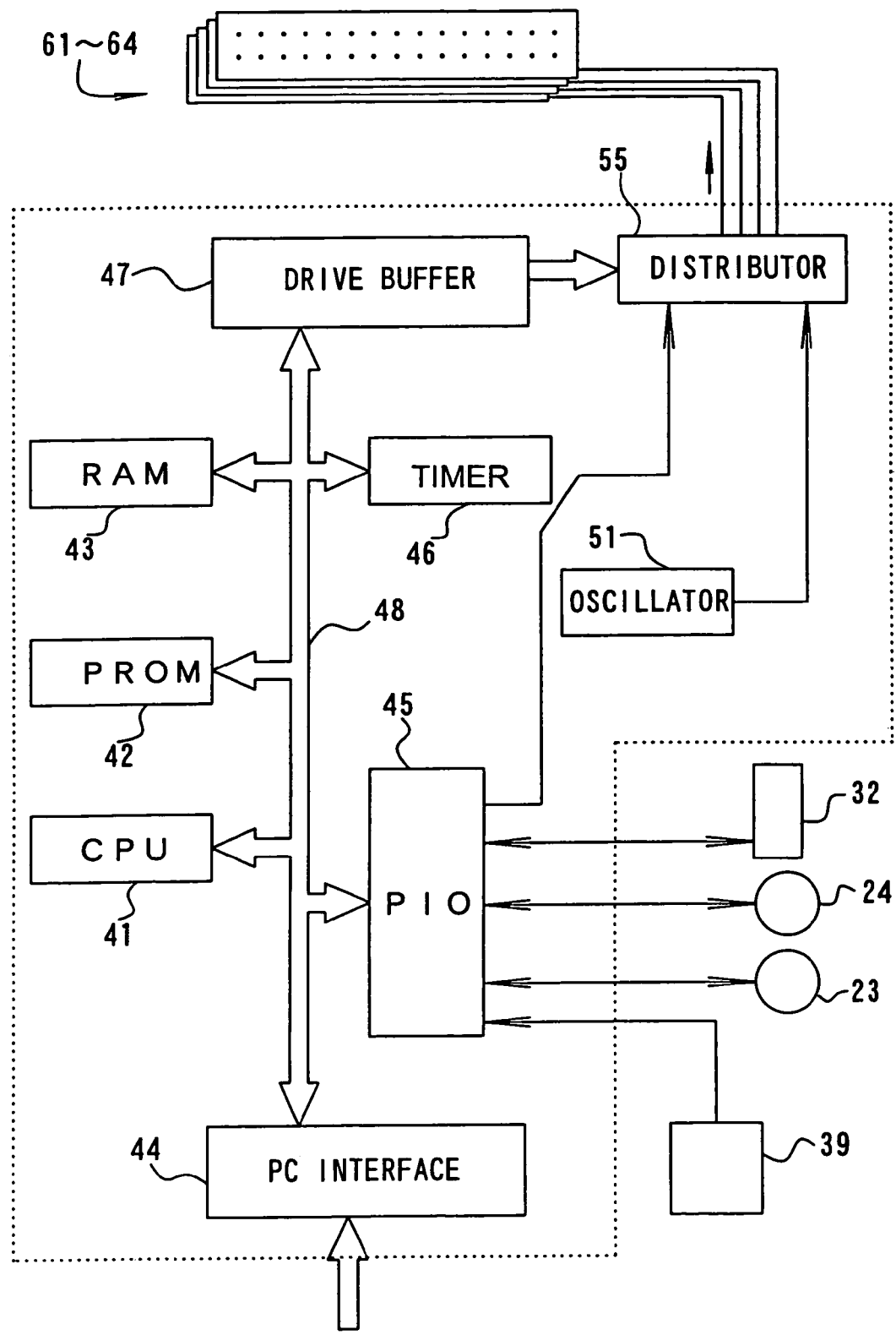
FIG. 6 shows the internal structure of a controller in the printer 22.

The internal structure of the control circuit 40 in the printer 22 is described with referring to FIG. 6. The control circuit 40 includes a CPU 41, a PROM 42, a RAM 43, a PC interface 44 that transmits data to and from the computer 90, a peripheral equipment input-output unit (PIO) 45 that transmits signals to and from the peripheral equipment, such as the sheet feed motor 23, the carriage motor 24, and the control panel 32, a timer 46 that counts the time, and a drive buffer 47 that outputs dot on-off signals to the ink ejection heads 61 through 64. These elements and circuits are mutually connected via a bus 48. The control circuit 40 further includes an oscillator 51 that outputs driving waveforms for driving the piezoelectric elements PE of the respective nozzles at selected frequencies and a distributor 55 that distributes the outputs from the oscillator 51 to the ink ejection heads 61 through 64.

The control circuit 40 receives print data processed by the computer 90, temporarily stores the processed print data in the RAM 43, and outputs the print data to the drive buffer 47 at a preset timing. The drive buffer 47 outputs data representing the dot on-off state of the respective nozzles to the distributor 55. This arrangement enables the driving waveforms for driving the piezoelectric elements PE to be output to the nozzles Nz in the dot-on state, and thereby attains creation of dots.

In this embodiment, the printer 22 has the print head that uses the piezoelectric elements PE to eject ink as discussed above. The printer may, however, adopt another technique for ejecting ink. One alternative structure of the printer supplies electricity to a heater installed in an ink conduit and utilizes the bubbles generated in the ink conduit to eject ink. The principle of the present invention may be applicable to various types of printers other than the ink ejection printers, for example, thermal transfer printers, sublimation printers, and dot impact printers.

(2) Control of Printing

Figure 7:
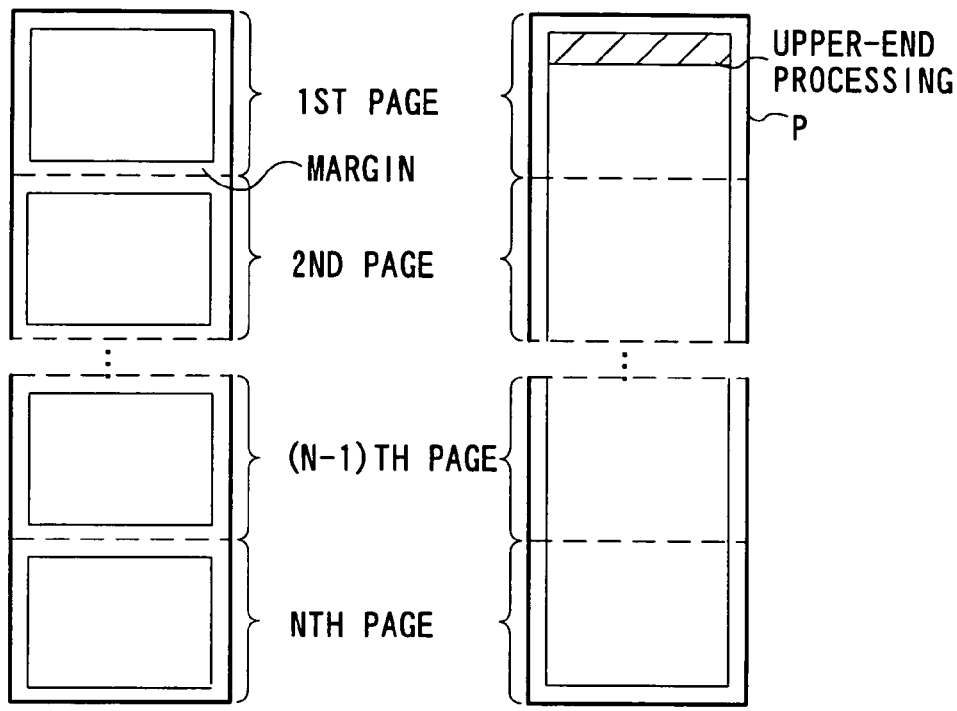
FIG. 7 respectively shows the state of printing images in a standard printing mode and in a continuous printing mode.

The following describes a printing control process executed in this embodiment. The description regards the process that prints an image on a large-sized printing medium. The printing apparatus of this embodiment has two different printing modes, that is, a standard printing mode and a continuous printing mode. FIG. 7 shows a state of printing images in the standard printing mode on the left side. Images are printed via margins set between the respective adjoining pages in the standard printing mode. FIG. 7 shows a state of printing an image in the continuous printing mode on the right side. In the continuous printing mode, one integrated image, which is transferred from the application program in a state of division into N pages (where N is an integer of not less than 2), is printed on the printing paper P without any margins between the adjoining pages.

The user of the printing apparatus may specify the printing mode. The continuous printing mode is selected when a large-sized image is generated by the application program. The CPU 81 in the computer 90 executes the application program. The CPU 81 divides the image data into a plurality of pages having a predetermined size and stores the divided image data with page size data into the RAM 83.

Figure 8:
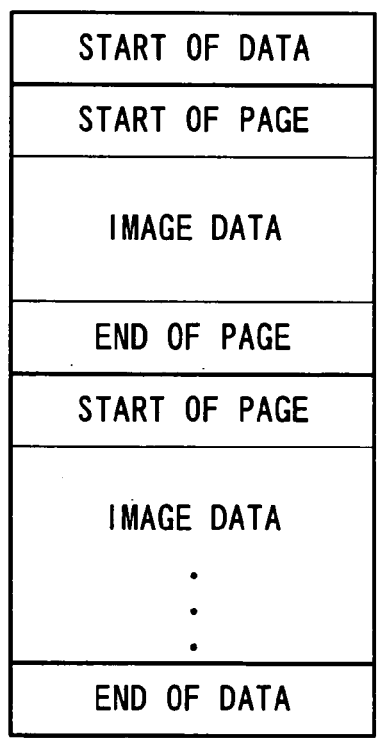
FIG. 8 shows the structure of a series of data transferred from an application program.

FIG. 8 shows the structure of a series of data transferred from the application program. A specific code representing 'start of data' is attached to the head of the series of data. The 'start of data' code is followed by a 'start of page' code representing the start of each page and image data corresponding to the page. An 'end of page' code is given to the end of each page. A specific code representing 'end of data' is attached to the end of the series of data. The data having such a data structure are output from the application program. At the time when the 'end of page' code is input, it can thus not be determined whether a next page is present or not. The 'start of page' code and the 'end of page' code are hereinafter collectively referred to as page division data.

Figure 9:
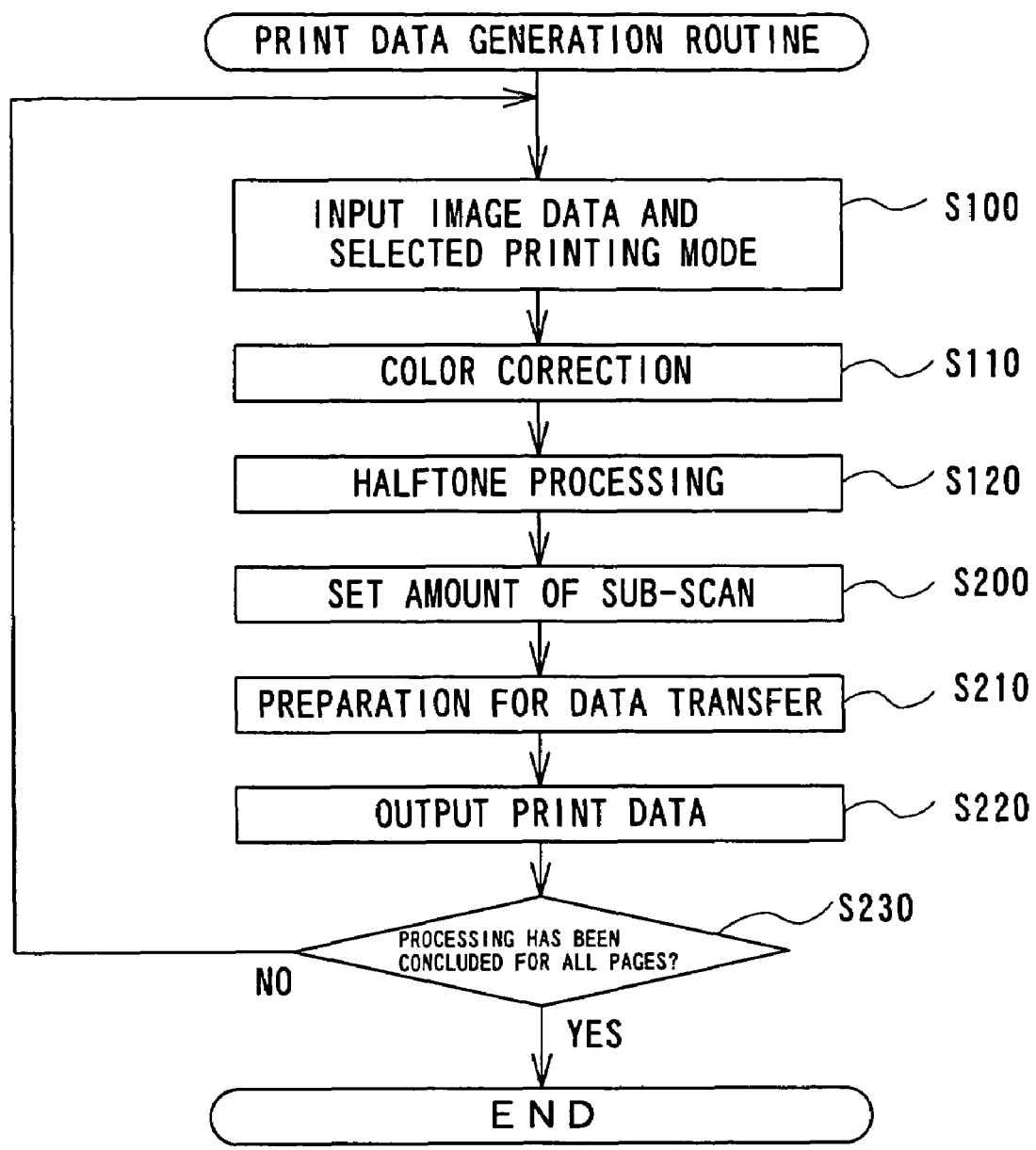
FIG. 9 is a flowchart showing a print data generation routine executed in the printing apparatus of the embodiment.

The CPU 81 also executes a printer driver program to drive the printer 22 and implement printing. The printer driver program is activated in response to a printing instruction from the application program. The flowchart of FIG. 9 shows a routine of generating print data, which is part of the processing by the CPU 81 to execute the printer driver program.

When the program enters the print data generation routine, the CPU 81 first inputs image data and the selected printing mode at step S100. The image data are divided into the respective pages as shown in FIG. 8 and expressed by the tone values of R, G, and B. The CPU 81 here inputs the page division data as well as the image data. The CPU 81 then carries out color conversion for the input image data at step S110. The process of color conversion corrects the R, G, and B color components for specifying the image data into color components C, M, Y, and K printable by the printer 22, with regard to each pixel. The color conversion process uses the color conversion table LUT, which specifies the C, M, Y, and K color components corresponding to each hue expressed by the R-G-B color system. The details of the color conversion process are known in the art and are thus not specifically described here.

Figure 10:
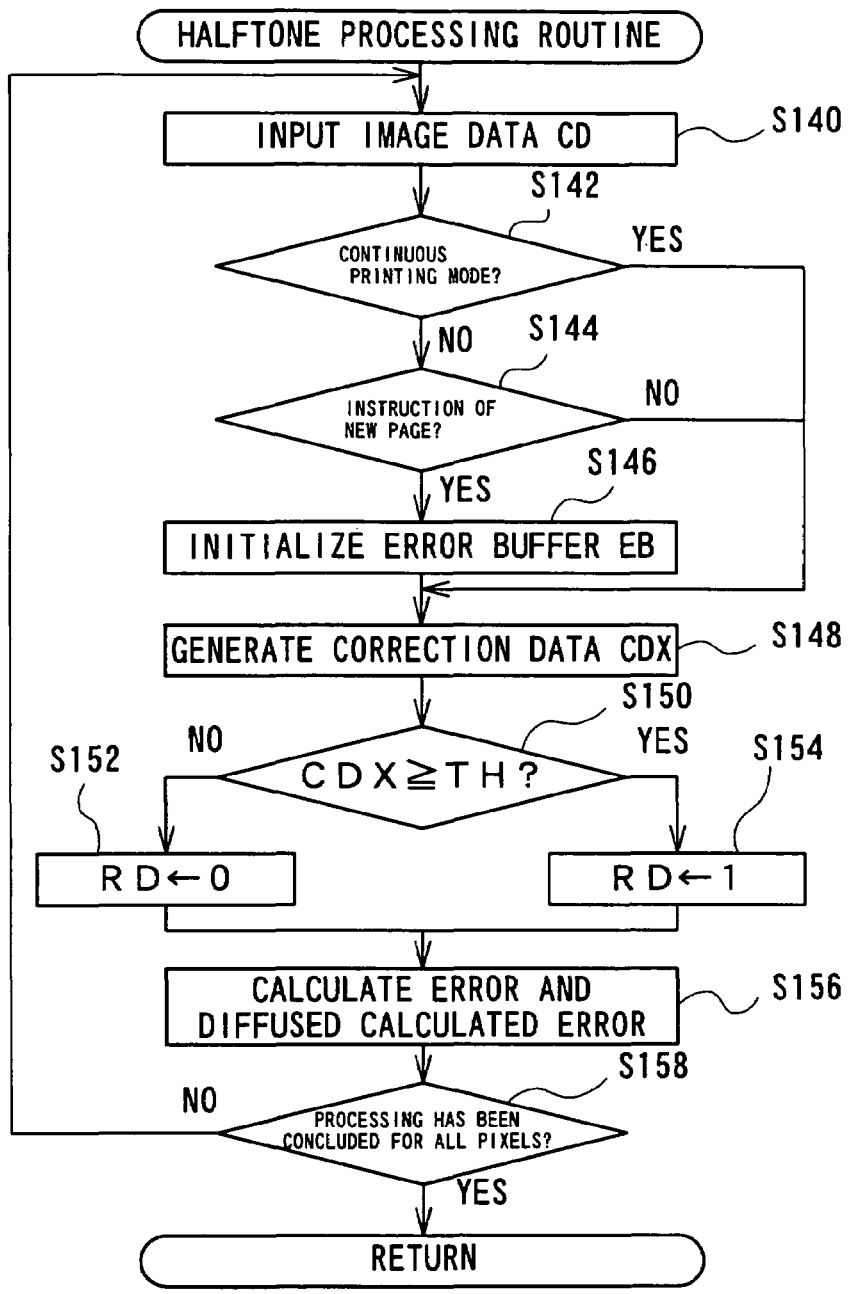
FIG. 10 is a flowchart showing the details of the halftone processing executed at step S120 in the flowchart of FIG. 9.

The CPU 81 subsequently carries out halftone processing for the color-converted image data at step S120. The details of the halftone processing are shown in the flowchart of FIG. 10. This embodiment applies the error diffusion method for the halftone processing. The dither method may alternatively be applied for the halftone processing. One preferable application selects either one of the error diffusion method and the dither method for the halftone processing according to the printing mode.

When the program enters the halftone processing routine shown in the flowchart of FIG. 10, the CPU 81 first inputs image data CD at step S140. The image data CD input at step S140 have been processed by the color conversion, and have tone values of the respective pixels in the range of 256 tones with regard to the respective colors C, M, Y, and K. At the boundary of each page, the CPU 81 inputs the page division data together with the image data. The CPU 81 then determines whether the continuous printing mode has been specified at step S142. When the selected printing mode is not the continuous printing mode but the standard printing mode, the CPU 81 further determines whether an instruction of a new page is given or not at step S144. The new page may be specified by the input or non-input of the page division data.

The CPU 81 carries out initialization of the error buffer EB at step S146, only when the standard printing mode has been selected and the instruction of a new page is given. The error buffer EB stores the density error to be diffused from each pixel to peripheral unprocessed pixels in the course of the halftone processing according to th1e error diffusion method. The contents of the error buffer EB will be discussed later. When the above conditions are not fulfilled, the CPU 81 does not carry out initialization of the error buffer EB. For example, when the continuous printing mode has been selected, the CPU 81 does not carry out initialization of the error buffer EB, irrespective of the result of the decision regarding the instruction of a new page.

The error diffusion method diffuses a local density error occurring in a certain pixel, which has just been processed to determine the dot on-off state, to peripheral unprocessed pixels with predetermined weights. The dot on-off state is determined with regard to a target pixel, which is currently being processed, after the errors diffused from the processed pixels are reflected on the tone data. The density error occurring in this target pixel as a result of the determination of the dot on-off state is subsequently diffused to peripheral unprocessed pixels.

The CPU 81 reflects the diffused errors on the image data CD and generates correction data CDX at step S148, in order to determine the dot on-off state of each pixel. The diffused errors to be reflected on the image data are stored in the error buffer EB.

The CPU 81 then compares the generated correction data CDX with a preset threshold value TH at step S150. In the case where the correction data CDX is not less than the preset threshold value TH, the program determines that a dot is to be created and inputs a value '1', which represents creation of a dot, into a resulting value RD, in which the result of determination is stored, at step S154. In the case where the correction data CDX is less than the preset threshold value TH, on the other hand, the program determines that no dot is to be created and inputs a value '0', which represents no creation of a dot, into the resulting value RD at step S152. The preset threshold value TH is a criterion for determination of the dot on-off state and may be equal to any arbitrary value. In this embodiment, the threshold value TH is set equal to 128, that is, an intermediate value of 256 tones, which the image data can take.

After the determination of the dot on-off state, the CPU 81 carries out calculation of an error ERR and an error diffusion process based on the resulting value RD at step S156. The error ERR here represents a difference between the density expressed in a target pixel PP, which is set either in the dot on state or in the dot off state according to the result of the multi-valuing process, and the density to be expressed corresponding to the generated correction data CDX. The density expressed in the target pixel PP in the dot on state is calculated from a density evaluation value RV that is set in advance with regard to each pixel.

The error ERR is thus calculated from the correction data CDX and the density evaluation value RV according to an equation of ERR=RV−CDX. For example, it is assumed that the density evaluation value RV of a dot in a target pixel PP corresponds to a tone value 255 and that a dot is created in the target pixel PP, to which the correction data CDX equal to 199 is allocated. In this case, there is a density difference of 199−256=−56, which is the error ERR. This means that the density expressed in the target pixel PP is higher than that to be expected.

Figure 11:
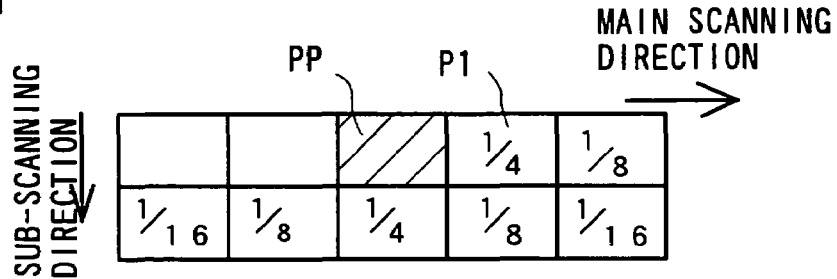
FIG. 11 shows a table of weights added in an error diffusion process.

The error diffusion process diffuses the error ERR thus calculated with regard to the target pixel PP into unprocessed pixels in the vicinity of the target pixel PP with certain weights. FIG. 11 shows an example of weights added in the error diffusion process. In this example, an error occurring in the target pixel PP is diffused into several unprocessed pixels both in the main scanning direction and in the sub-scanning direction. For example, when the error in the target pixel PP is equal to '−56', one quarter of the error '−56', that is, '−14' is allocated to a pixel P1, which is adjacent to the target pixel PP currently processed. The diffused error is temporarily stored in the error buffer EB and made to reflect on the generation of the correction data CDX with regard to the next pixel P1 at step S148 in the flowchart of FIG. 10. For example, when the tone data of the pixel P1 is equal to 214, the generated correction data CD is calculated to 200 by adding the diffused error '−14' to the tone data. The CPU 81 repeats the series of the processing of steps S140 through S156 until it is determined that the processing has been concluded for all the pixels at step S158. The program then exits from the halftone processing routine shown in the flowchart of FIG. 10 and returns to the print data generation routine shown in the flowchart of FIG. 9.

Figure 13A:
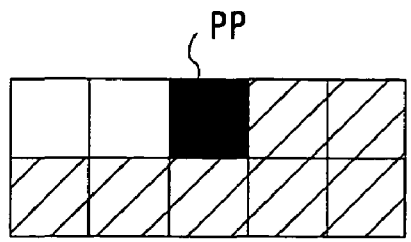
FIGS. 13A and 13B show the halftone processing by the error diffusion method.
Figure 13B:
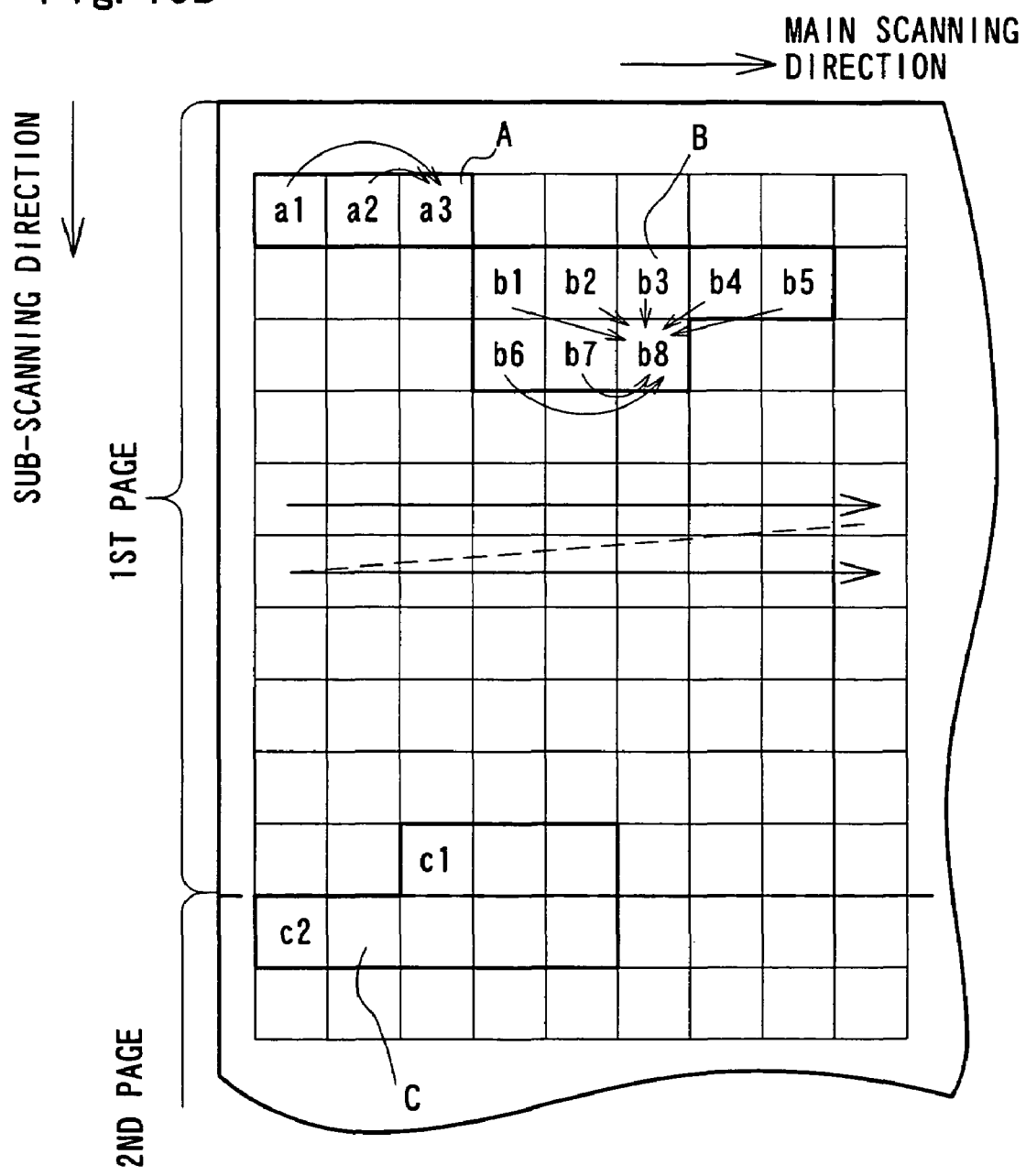

As described previously, the error buffer EB is initialized on every instruction of a new page in the standard printing mode. Namely the errors in one page are not diffused to pixels in a next page in the standard printing mode. This is because the halftone processing is carried out independently for each page. In the continuous printing mode, on the other hand, the error buffer EB is not initialized irrespective of the instruction of a new page. Namely an error occurring in a certain pixel included in one page, which is present in the vicinity of the boundary between one page and a next page, is diffused to pixels included in the next page. This process is shown in FIG. 13B. In the example of FIG. 13B, an error occurring in a certain pixel c1, which belongs to a $1^{st}$ page, is diffused to an area C that includes a pixel c2, which belongs to a $2^{nd}$ page. The halftone processing with regard to the $2^{nd}$ page is then carried out without initialization of the error buffer EB. The error diffused from the pixel c1 is accordingly reflected on the processing of the pixel c2. In this manner, the printing apparatus of the embodiment collectively processes image data with regard to a plurality of pages by the halftone processing in the continuous printing mode.

Referring back to the print data generation routine shown in the flowchart of FIG. 9, after the halftone processing is completed at step S120, the CPU 81 sets an amount of sub-scan in the printer 22 and carries out extraction of data to be transferred to the printer 22 at step S200. The printer 22 records dots by an interlace method. The amount of sub-scan in the printer 22 is stored in advance as the feed amount table SS in the ROM 82 of the computer 90. The CPU 81 refers to the feed amount table SS to set the amount of sub-scan, and carries out extraction of data to be transferred to the printer 22. In accordance with a concrete procedure, the CPU 81 specifies raster lines in the image data to be formed by the respective nozzles in the printer 22 and extracts data of the specified raster lines.

Figure 12:
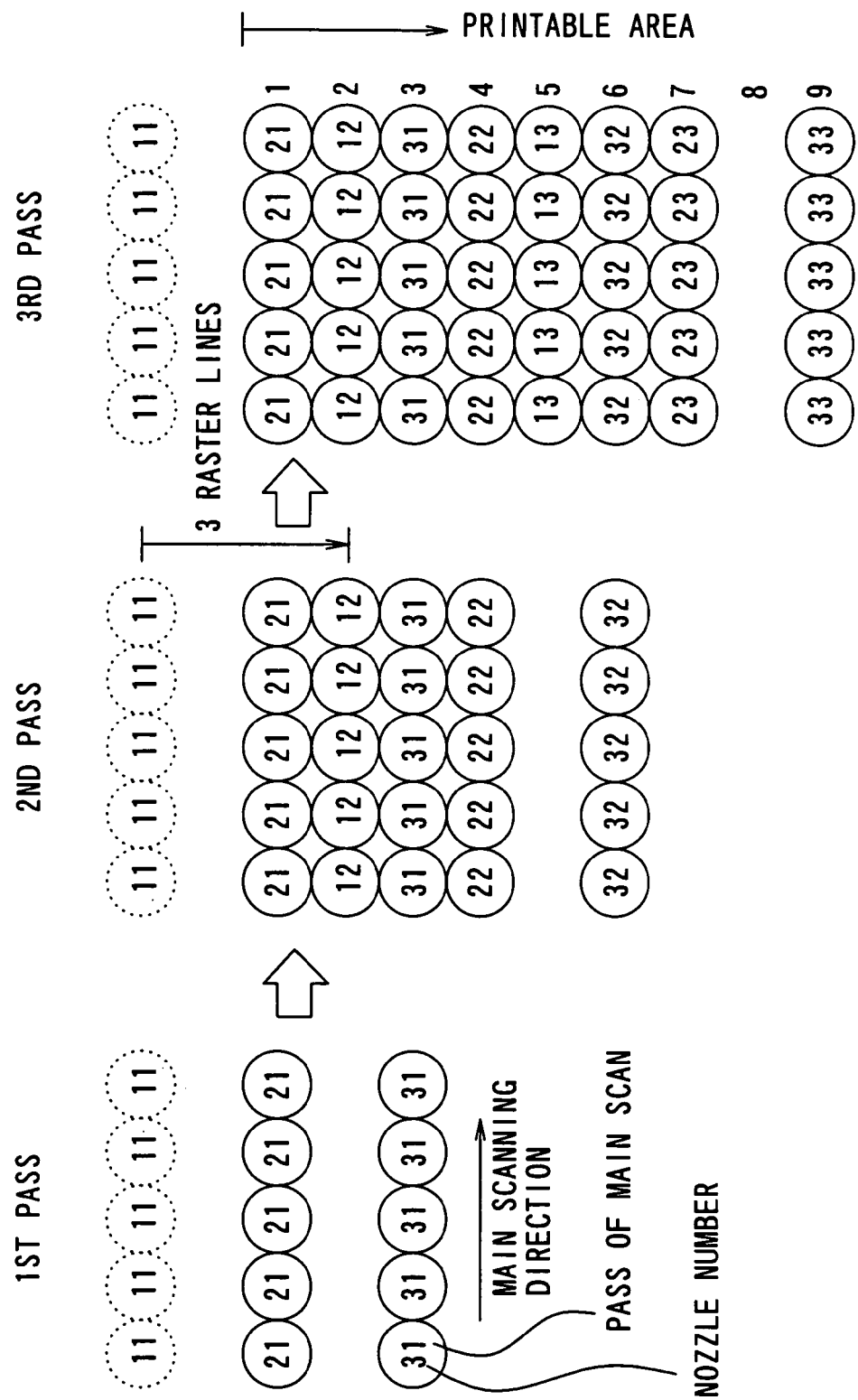
FIG. 12 shows a state of dot creation.

FIG. 12 shows an example of the interlace process. For convenience of illustration, the example of FIG. 12 records dots at a two-dot pitch using three nozzles. Circles in FIG. 12 represent dots created by the respective nozzles. The tens digit in each encircled numeral represents a nozzle number that creates the dot, and the units digit represents the pass of main scan that records the dot. In this example, the $1^{st}$ pass of the main scan creates dots on the respective raster lines with the $2^{nd}$ nozzle and the $3^{rd}$ nozzle, whereas the $1^{st}$ nozzle does not create any dots. After a sub-scan by 3 raster lines, the $2^{nd}$ pass of the main scan is carried out to form raster lines with all the $1^{st}$ through the $3^{rd}$ nozzles. Subsequently the combination of the sub-scan by 3 raster lines with formation of raster lines by each pass of the main scan is repeated to complete an image in a printing area shown in FIG. 12.

In the $1^{st}$ pass of the main scan, the CPU 81 extracts data of a $1^{st}$ raster line included in the image data and supplies the extracted data to the $2^{nd}$ nozzle, whereas extracting data of a $3^{rd}$ raster line and supplying the extracted data to the $3^{rd}$ nozzle. For the purpose of reference, the numerals on the right-most column in FIG. 12 show raster line numbers allocated to the respective raster lines included in the image data. In the $2^{nd}$ pass of the main scan, the CPU 81 supplies data of a $2^{nd}$ raster line to the $1^{st}$ nozzle, data of a $4^{th}$ raster line to the $2^{nd}$ nozzle, and data of a $6^{th}$ raster line to the $3^{rd}$ nozzle. In this manner, the CPU 81 extracts data of raster lines to be supplied to the respective nozzles by taking into account the amount of sub-scan.

Referring back to the print data generation routine shown in the flowchart of FIG. 9, the CPU 81 rearranges the extracted data, which are to be supplied to the respective nozzles, to a sequence of data actually transferred to the printer 22 and implements preparation for data transfer at step S210. For example, in the case where an image is printed by bi-directional recording, that is, by both a forward pass and a backward pass of the main scan, the data array is inverted according to the direction of the main scan. In the case of overlap recording that forms each raster line with two nozzles, data are rearranged in such a manner that data of odd-positioned pixels are supplied to one nozzle and data of even-positioned pixels are supplied to the other nozzle. With regard to the nozzle that creates dots only in the odd-numbered pixels, mask data are given to the even-numbered pixels.

The CPU 81 outputs the rearranged data and the data regarding the amount of sub-scan as print data to the printer 22 at step S220. The CPU 81 repeats the series of processing of steps S100 through S220 until it is determined that the processing has been concluded for all the pages at step S230. Although all the image data with regard to each page are input at step S100 in the procedure of the first embodiment shown in FIG. 9, the image data with regard to each page may be input successively by some divisions, while the color conversion and the halftone processing are carried out. The printer 22 prints an image in the manner discussed with FIG. 12, based on the print data, that is, the processed image data and the data regarding the amount of sub-scan, output from the computer 90.

The printing apparatus described above carries out the halftone processing without initializing the error buffer EB for each page when the continuous printing mode is specified. The printing apparatus of the embodiment thus enables the data divided in a plurality of pages and supplied from the application program to be processed integrally by the halftone processing. The disadvantage of the error diffusion method is that the picture quality is a little lower in a first part where the halftone processing starts than in the other part. The printing apparatus of the embodiment does not initialize the error buffer EB on the start of each page in the continuous printing mode, and thereby effectively prevents the picture quality from being lowered in the vicinity of the boundary between adjoining pages. The printing apparatus of the above arrangement thus ensures the high-quality printing in the continuous printing mode.

In the printing apparatus of the embodiment, the error buffer EB is initialized on the start of each page in the standard printing mode. Independent image data with regard to each page are supplied in the standard printing mode. The halftone processing that diffuses errors from one page to a next page across the boundary in the standard printing mode deteriorates the picture quality of each page by the effect of the errors occurring in a previous page. The printing apparatus of the embodiment determines execution or non-execution of the initialization of the error buffer on the start of each page according to the selected printing mode, thereby enabling the high-quality halftone processing in the selected printing mode.

(3) Second Embodiment

Figure 14:
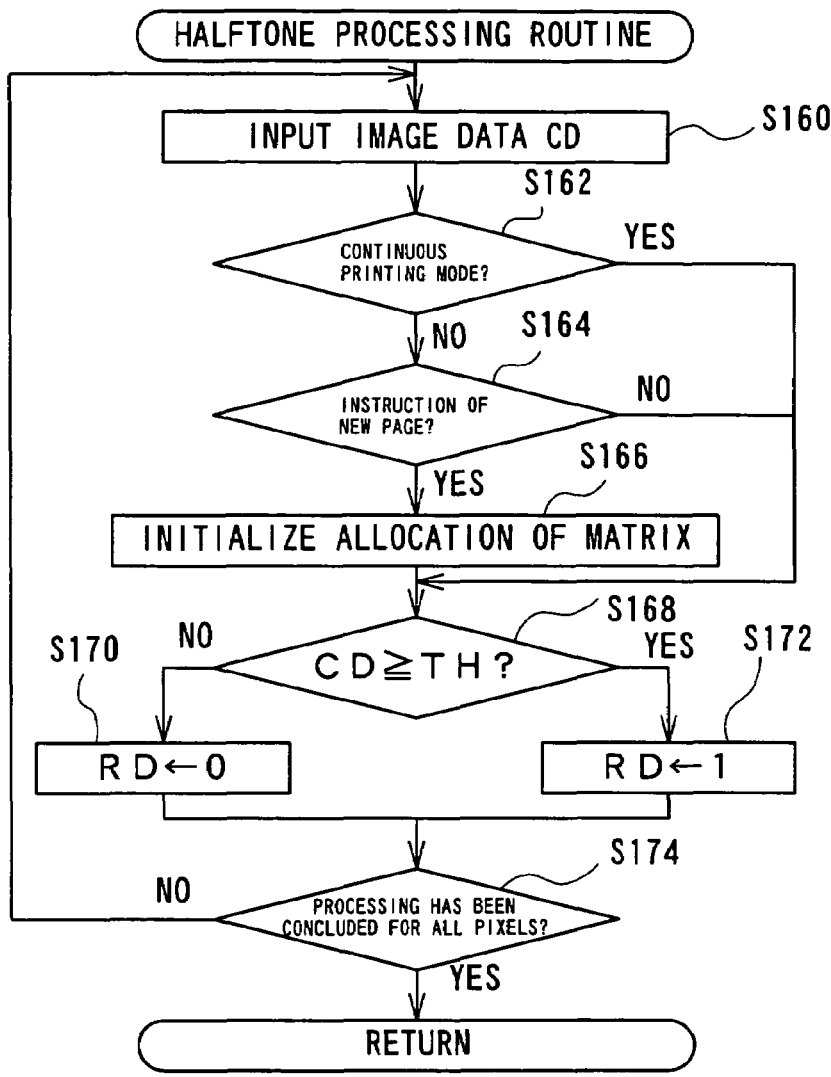
FIG. 14 is a flowchart showing a halftone processing routine executed in a second embodiment according to the present invention.

The following describes a system including an image processing apparatus and a printing apparatus in a second embodiment according to the present invention. The hardware configuration of the second embodiment is substantially identical with that of the first embodiment. The only difference from the first embodiment is that the dither method is applied for the halftone processing in the second embodiment. The flowchart of FIG. 14 shows a halftone processing routine executed in the second embodiment. Like the first embodiment, the halftone processing of the second embodiment is executed by the CPU 81 incorporated in the computer 90.

When the program enters the halftone processing routine of FIG. 14, the CPU 81 first inputs image data CD with regard to a target pixel, which is an object to be processed, at step S160 and successively determines whether or not the continuous printing mode has been specified at step S162 and whether or not the instruction of a new page has been input at step S164. When the instruction of a new page is input while the continuous printing mode is not specified, that is, while the standard printing mode is selected, the CPU 81 initializes an allocation of a matrix at step S166. The initialization of the allocation of the matrix will be discussed later in detail.

The CPU 81 then compares the tone value of the input image data CD with a predetermined threshold value TH at step S168. In the case where the image data CD is not less than the predetermined threshold value TH at step S168, the program determines that a dot is to be created in the target pixel and sets a value '1' representing creation of a dot to a resulting value RD, in which the result of the determination is stored, at step S172. In the case where the image data CD is less than the predetermined threshold value TH at step S168, on the other hand, the program determines that no dot is to be created in the target pixel and sets a value '0' representing no creation of a dot to the resulting value RD at step S170.

Figure 15:
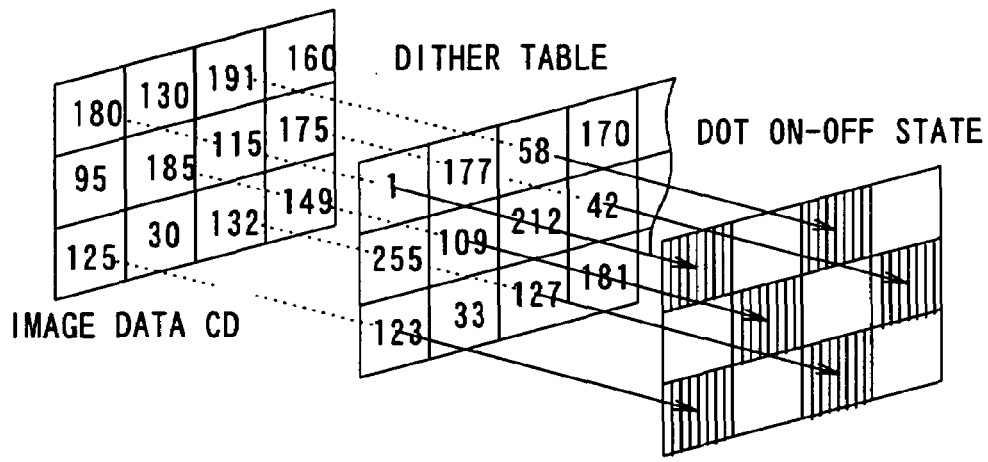
FIG. 15 shows the halftone processing by the dither method.

The threshold value TH is given by a dither matrix. FIG. 15 shows the principle of determining the dot on-off state in the dither method. For convenience of illustration, only part of the dither matrix and the image data CD are shown in FIG. 15. The image data CD is compared with a threshold value that is included in the dither matrix and corresponds to each pixel, and the dot on-off state of each pixel is determined, based on the result of the comparison. In the example of FIG. 15, pixels in the dot-on state are shown in hatch. The CPU 81 repeats the series of the processing of steps S160 through S172 until it is determined that the processing has been concluded for all the pixels at step S174.

Figures 16A, 16B:
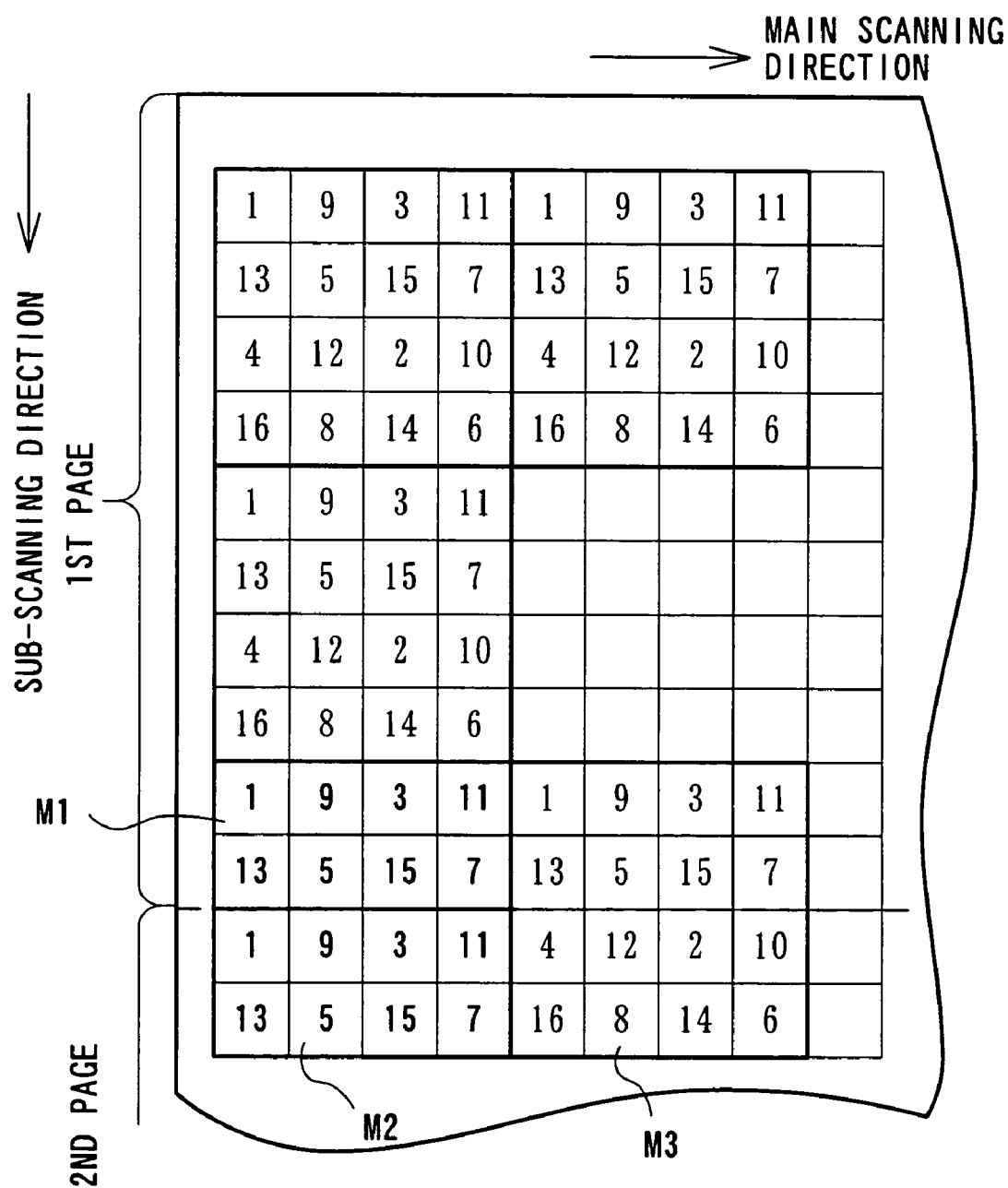
FIGS. 16A and 16B show methods of allocation of a dither matrix to the respective pixels.

The dither method allocates the dither matrix to the respective pixels in a predetermined arrangement and carries out the halftone processing. FIG. 16A shows a dither matrix as an available example. FIG. 16B shows an exemplified arrangement, in which the dither matrix is allocated to the respective pixels. In this example, a 4×4 dither matrix is allocated to the respective pixels in sections. The dither matrix is not restricted to this size but may have any adequate size.

The initialization process of the allocation of the dither matrix at step S166 in the flowchart of FIG. 14 newly allocates the dither matrix in response to an input of the instruction of a new page as shown by the areas M1 and M2 in FIG. 16B. When the instruction of a new page is input in the standard printing mode, the allocation of the dither matrix is initialized, so that the halftone processing is carried out independently for each page. In the case of the continuous printing mode, on the other hand, the allocation of the dither matrix is not initialized on the start of a next page. This arrangement causes the dither matrix to be arranged across the boundary between adjoining pages as shown by the area M3 in FIG. 16B.

The dither matrix is typically designed to ensure the sufficient dispersibility of dots within a single matrix. The image processing apparatus of the second embodiment allows the dither matrix to be allocated across the boundary between two pages, when the continuous printing mode is specified. This ensures the sufficient dispersibility of dots on the boundary and thereby enables the high-quality image processing.

In the printing apparatuses of the above embodiments, the halftone processing carries out the binarization, that is, determines the dot on-off state of the respective pixels. The principle of the present invention is also applicable to the halftone processing in the ternary or greater notation according to the error diffusion method or the dither method.

In the printing apparatuses of the first and the second embodiments discussed above, the print data generation process shown in FIG. 9 is executed by the computer. The present invention is accordingly attained by a recording medium, in which a computer program for executing the required process is recorded. Instead of the CPU 81 included in the computer 90, the CPU 41 included in the printer 22 may execute the print data generation routine shown in the flowchart of FIG. 9.

The present invention is not restricted to the above embodiments or their modifications, but there may be many other modifications, changes, and alterations without departing from the scope or spirit of the main characteristics of the present invention. For example, part or all of the controlling processes discussed in the above embodiments may be actualized by the hardware configuration. In the above embodiments, a roll of machine glazed paper is set via an appropriate fixture to the printer that mainly uses standard-sized sheets of cut paper. The principle of the present invention is also applicable to the printer that mainly uses a roll of machine glazed paper. The printing medium is not restricted to the roll of machine glazed paper, but may be any medium on which a large-sized image can be printed.

The scope and spirit of the present invention are limited only by the terms of the appended claims.

What is claimed is:

1. An image processing apparatus that processes image data with regard to a plurality of pages by halftone processing, said image processing apparatus comprising:
   an input unit that inputs the image data which has a variable length;
   an image dividing unit that divides the image data into the plurality of pages each having a predetermined size;
   a division data generating unit that generates division data from the plurality of pages, the division data indicating a boundary between adjacent pages; and a halftone processing unit that performs a halftone processing on a collective set of the plurality of pages and the division data, wherein, in a continuous mode, the halftone processing unit performs the halftone processing on each page using parameters while the parameters used in the halftone processing of a previous page are maintained beyond the boundary irrespective of the division data, and in a standard mode, when the division data is detected, the halftone processing unit performs the halftone processing on each page using the parameters after initialization of the parameters used in the halftone processing of the previous page.

2. An image processing apparatus in accordance with claim 1, said image processing apparatus further comprising:

a mode input unit that inputs an instruction of the continuous mode, in which the image data with regard to the plurality of pages are processed as a collective set of image data, wherein said halftone processing unit carries out the halftone processing in the state where the continuity of the processing is assured, only when the instruction of the continuous mode is input.

3. An image processing apparatus in accordance with claim 1, wherein in the continuous mode, said halftone processing unit performs the halftone processing on the image data by a unit of each pixel using an error diffusion method, the error diffusion method diffusing an error in a target pixel, to a specific pixel at a predetermined position relative to the target pixel, regardless of whether the target pixel and the specific pixel are in an identical page or different pages, the target pixel being directed to the error diffusion method, the error representing a difference between a value of the image data allocated to the target pixel and a result value of the halftone processing for the target pixel.

4. An image processing apparatus in accordance with claim 3, wherein said input unit inputs an instruction of the continuous mode, in which the image data with regard to the plurality of pages are processed as a collective set of image data, as well as page division data, and said halftone processing unit comprises:

an error storage unit that temporarily stores diffused errors;

an initialization unit that carries out initialization of said error storage unit in response to an input of the page division data; and a prohibition unit that prohibits the initialization of said error storage unit when the instruction of the continuous mode is input.

5. An image processing apparatus in accordance with claim 1, wherein in the continuous mode, said halftone processing unit carries out the halftone processing according to a dither method, which allows a dither matrix to be arranged across the boundary between the adjoining pages.

6. An image processing apparatus in accordance with claim 5, wherein said input unit inputs a specification of a continuous mode, in which the image data with regard to the plurality of pages are processed as a collective set of image data, as well as page division data, and said halftone processing unit comprises:

an allocation storage unit that stores an allocation of the dither matrix to pixels;

an initialization unit that carries out initialization of said allocation storage unit in response to an input of the page division data so as to set the allocation of the dither matrix to a predetermined state in each page; and a prohibition unit that prohibits the initialization of said allocation storage unit when the instruction of the continuous mode is input.

7. A printing apparatus that creates dots based on image data with regard to a plurality of pages and thereby prints an image on a specific printing medium, which has a size of or over the plurality of pages, said printing apparatus comprising:

an input unit that inputs the image data which has a variable length;

an image dividing unit that divides the image data into the plurality of pages each having a predetermined size;

a division data generating unit that generates division data from the plurality of pages, the division data indicating a boundary between adjacent pages;

a halftone processing unit that performs a halftone processing on a collective set of the plurality of pages and the division data, wherein, in a continuous mode, the halftone processing unit performs the halftone processing on each page using parameters while the parameters used in the halftone processing of a previous page are maintained beyond the boundary irrespective of the division data, and in a standard mode, when the division data is detected, the halftone processing unit performs the halftone processing on each page using the parameters after initialization of the parameters used in the halftone processing of the previous page; and a dot creation unit that creates a dot in each pixel, based on a result of the halftone processing.

8. A method of processing image data with regard to a plurality of pages by halftone processing, said method comprising the steps of:

inputting the image data which has a variable length;

dividing the image data into the plurality of pages each having a predetermined size;

generating division data from the plurality of pages, the division data indicating a boundary between adjacent pages; and performing a halftone processing in a continuous mode on a collective set of the plurality of pages and the division data and on each page using parameters while the parameters used in the performing the halftone processing of a previous page are maintained beyond the boundary irrespective of the division data, and performing a halftone processing in a standard mode on each page using the parameters after initialization of the parameters used in the halftone processing of the previous page when the division data is detected.

9. A computer readable medium, in which a specific computer program is recorded, said specific computer program being used to process image data with regard to a plurality of pages by halftone processing, said specific computer program comprising:

a program code that causes a computer to input the image data which has a variable length;

a program code that causes the computer to divide the image data into a plurality of pages each having a predetermined size;

a program code that causes the computer to generate division data from the plurality of pages, the division data indicating a boundary between adjacent pages;

a program code that causes the computer to perform a halftone processing in a continuous mode according to an error diffusion method on a collective set of the plurality of pages and the division data, wherein the halftone processing is performed on each page using parameters while the parameters used in the halftone processing of a previous page are maintained beyond the boundary irrespective of the division data; and a program code that causes the computer to perform a halftone processing in a standard mode on each page according to the error diffusion method using the parameters after initialization of the parameters used in the halftone processing of the previous page when the division data is detected.

10. A computer readable medium, in which a specific computer program is recorded, said specific computer program being used to process image data with regard to a plurality of pages by halftone processing, said specific computer program comprising:

a program code that causes a computer to input the image data which has a variable length;

a program code that causes the computer to divide the image data into a plurality of pages each having a predetermined size;

a program code that causes the computer to generate division data from the plurality of pages, the division data indicating a boundary between adjacent pages;

a program code that causes the computer to perform a halftone processing in a continuous mode according to a dither method on a collective set of the plurality of pages and the division data, wherein the halftone processing is performed on each page using parameters while the parameters used in the halftone processing of a previous page are maintained beyond the boundary irrespective of the division data; and a program code that causes the computer to perform a halftone processing in a standard mode on each page according to the dither method using the parameters after initialization of the parameters used in the halftone processing of the previous page when the division data is detected.

* * * * *